US008622829B2

(12) United States Patent
Nelson

(10) Patent No.: US 8,622,829 B2
(45) Date of Patent: Jan. 7, 2014

(54) PORTABLE GAMING DEVICE

(71) Applicant: Bally Gaming, Inc., Las Vegas, NV (US)

(72) Inventor: Loren Nelson, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/875,939

(22) Filed: May 2, 2013

(65) Prior Publication Data

US 2013/0244753 A1 Sep. 19, 2013

Related U.S. Application Data

(63) Continuation of application No. 13/756,796, filed on Feb. 1, 2013, now Pat. No. 8,480,489, which is a continuation of application No. 13/372,035, filed on Feb. 13, 2012, now Pat. No. 8,376,847, which is a continuation of application No. 12/055,049, filed on Mar. 25, 2008, now Pat. No. 8,113,952, which is a continuation of application No. 11/233,923, filed on Sep. 22, 2005, now Pat. No. 7,727,069.

(60) Provisional application No. 60/615,710, filed on Oct. 4, 2004, provisional application No. 60/620,190, filed on Oct. 19, 2004.

(51) Int. Cl.
*A63F 13/00* (2006.01)

(52) U.S. Cl.
USPC .................................. 463/31; 463/20; 463/27

(58) Field of Classification Search
USPC .............................. 463/16, 20, 25, 27, 30, 31
See application file for complete search history.

(56) References Cited

U.S. PATENT DOCUMENTS

| | | | | |
|---|---|---|---|---|
| 5,725,428 | A * | 3/1998 | Achmuller | 463/20 |
| 5,752,881 | A * | 5/1998 | Inoue | 463/20 |
| 6,210,275 | B1 * | 4/2001 | Olsen | 463/16 |
| 6,270,411 | B1 * | 8/2001 | Gura et al. | 463/20 |
| 7,175,523 | B2 * | 2/2007 | Gilmore et al. | 463/16 |
| 7,473,173 | B2 * | 1/2009 | Peterson et al. | 463/20 |
| 2001/0009865 | A1 * | 7/2001 | Demar et al. | 463/20 |
| 2003/0216165 | A1 * | 11/2003 | Singer et al. | 463/20 |
| 2004/0214635 | A1 * | 10/2004 | Okada | 463/30 |
| 2005/0059478 | A1 * | 3/2005 | Peterson et al. | 463/20 |

* cited by examiner

*Primary Examiner* — James S McClellan
(74) *Attorney, Agent, or Firm* — Marvin Hein

(57) ABSTRACT

Disclosed is a new bonus game for reel-based slot machines. The bonus game is an embedded slot game, with one embodiment animating miniature reels inside the primary game symbol. Each embedded slot game may have its own progressive, or may be tied into the progress associated with the primary game. Each embedded slot game will have its own paytable, and may be a miniature version of a well-recognized full-sized slot game.

9 Claims, 2 Drawing Sheets

Game Device
With Embedded Reel
Games Including
Embedded Progressives
Associated With One
Or More Embedded
Reel Game Method For Playing Embedded Reel Games

PORTABLE GAMING DEVICE

RELATED APPLICATIONS

This application claims the benefit of provisional application 60/615,710 filed on Oct. 4, 2004, and provisional application 60/620,190 filed on Oct. 19, 2004. Provisional applications 60/615,710 and 60/620,190 are herby incorporated in full herein, by explicit reference.

BACKGROUND

1. Field of the Disclosure

This invention pertains generally to gaming systems. More particularly, the present invention discloses a reel game in which some winning symbols are themselves miniature reel games, which, upon a triggering event, play while remaining inside, or embedded in, a full-size reel game. This includes both traditional win events and progressives associated with each embedded reel game or with associated a progressive with a collection of the embedded reel games.

2. The Prior Art

Reel gaming machines with static reel symbols are known. Current reel games use either mechanical reels or show a video representation reels. Various modifications have been made over the years to create additional interest in standard reel games. An example improvement can be found in U.S. Pat. No. 6,731,313 to Kaminkow, where a player can make manual requests to change reel symbols. Another is U.S. Pat. No. 6,702,675 to Poole, which discloses animal animations on reel symbols. There is room for further improvement in reel games.

BRIEF DESCRIPTION

Presently disclosed is a novel and non-obvious embedded reel game. The game comprises a reel game which is typically a 5 reel, 20 payline game, but the present invention can be implemented using any number of reels or paylines, from 1 to any number that is comfortable to players. Included on the reels is at least one, and preferably one per reel, special symbols which appear to be, or visually corresponds to, a miniature reel machine. One embodiment has three miniature reels therein. When the miniature reels are in the right position (a win event in the main game), the miniature reel game symbol animates and plays a complete, standalone game of its own. This includes having its own paytable and, where applicable, its own progressive. These miniature reel games may be unique to the game, or may be miniature representations of actual full-size reel games. If the miniature game is a small version of a full-size game, the full-size game's paytable will be used. The player is awarded any winnings from the spin of the miniature reel game, after which the main game continues.

The bonus games disclosed herein may be configured for use with reel games having as few as a single reel. The paytables in such a game would be configured to trigger bonus rounds more frequently than is typical in multi-reel games, allowing quick repetitive play and frequent bonus game play. This provides additional pleasure to players wanting the visual enjoyment of the miniature reel game presented in this disclosure.

Another embodiment of the present inventive concept involves having "telescoping" embedded miniature reel games. Upon a first bonus game trigger, the embedded miniature reel games are triggered. Each embedded miniature reel game will have, on its reels, symbols corresponding to its own embedded reel games. Because it would be too difficult to see more than one level of embedded reels, a faux magnifying glass effect would be used in the area of the miniature embedded reel game. When the first level embedded reel game is played, it is enlarged as if looking through a magnifying glass placed over a portion of the main display screen. This allows the second-level embedded miniature reel games to be visible inside the first level embedded miniature reel game. If a win event occurs in the first level embedded miniature reel game that triggers its own embedded miniature reel games (the second level games), these second level games are animated and played. If the second level reel games have embedded reel games, these will be further magnified until a maximum level of embedded game is reached.

Telescoping embedded games need not be represented as miniature games, other visual representations could be used.

Embedded reel games may be shown using bonus game symbols that, when triggered, are associated with an embedded reel game, or may be a picture of the embedded reel game itself. The embedded reel games, when triggered, may be shown as a direct animation of the bonus game symbol, as an overlay animation of the bonus game symbol, or may be shown in a different section of the screen. If used with mechanical reels, the embedded games would be shown on a separate video display. The embedded games may be miniature reel games or may be shown as substantially the same size as the main game. "Embedded" refers to the concept of triggering a bonus reel game from inside a main reel game, and bringing the triggered reel game to life while allowing most of the primary game to remain visible (how much depends on how big the embedded reel games are made by game designers). In one embodiment, the embedded reel games are genuinely miniature, being 1/10 or less the size of the main game. This greatly enhances the "cute" effect of the embedded bonus game. Any reduced size may be used for effect, of course. Generally anything less than ½ the size of the primary game is considered substantially smaller than the primary game and will create at least some of the desirable "cute" effect.

Each embedded reel game may be associated with a progressive jackpot. One embodiment has each embedded game associated with the same progressive game as the main game. Alternatively, each embedded game may have its own progressive jackpot. In yet another embodiment, each embedded game is associated with a jackpot contributed to by other embedded games, the other embedded games being all embedded games in a bank, or, other embedded games in a wide area progressive.

DETAILED DESCRIPTION

Persons of ordinary skill in the art will realize that the following description of the present invention is illustrative only and not in any way limiting. Other embodiments of the invention will readily suggest themselves to such skilled persons having the benefit of this disclosure.

Figure 1:
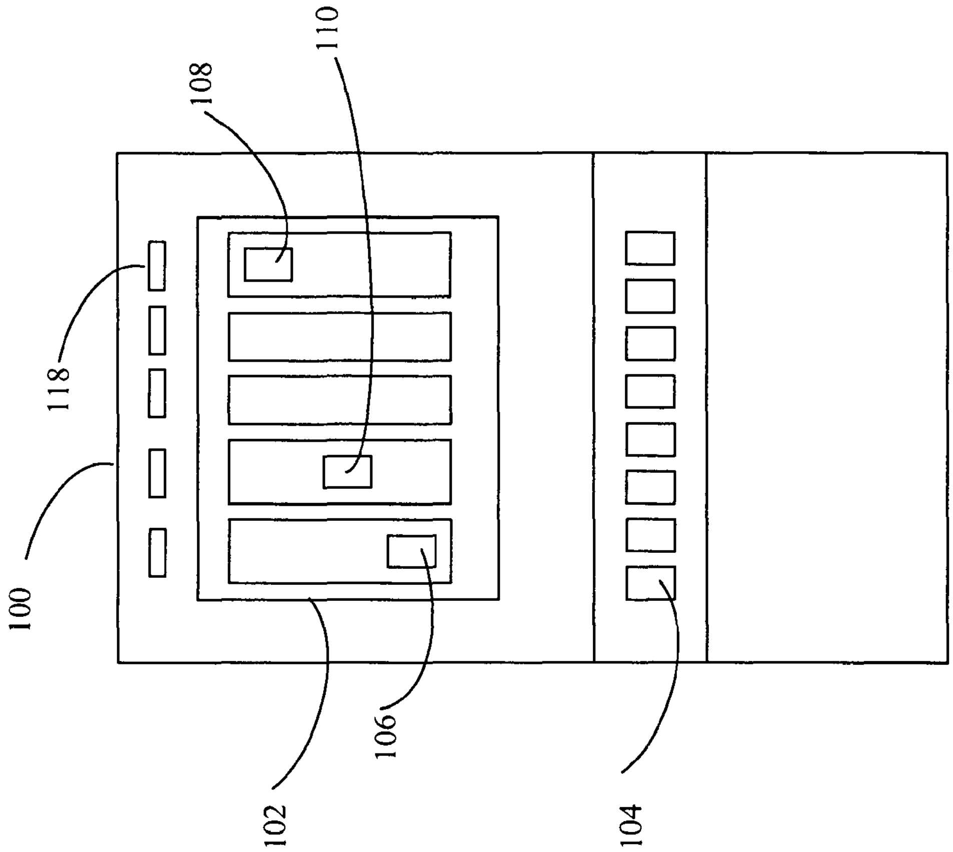
FIG. 1 is a functional block diagram of an example game device in accordance with the present invention.
Figure 1:
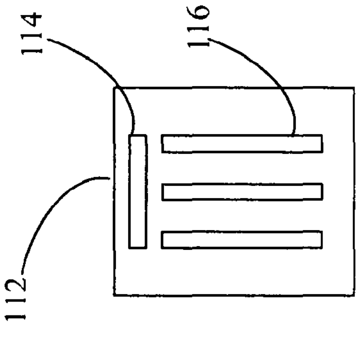
Figure 2:
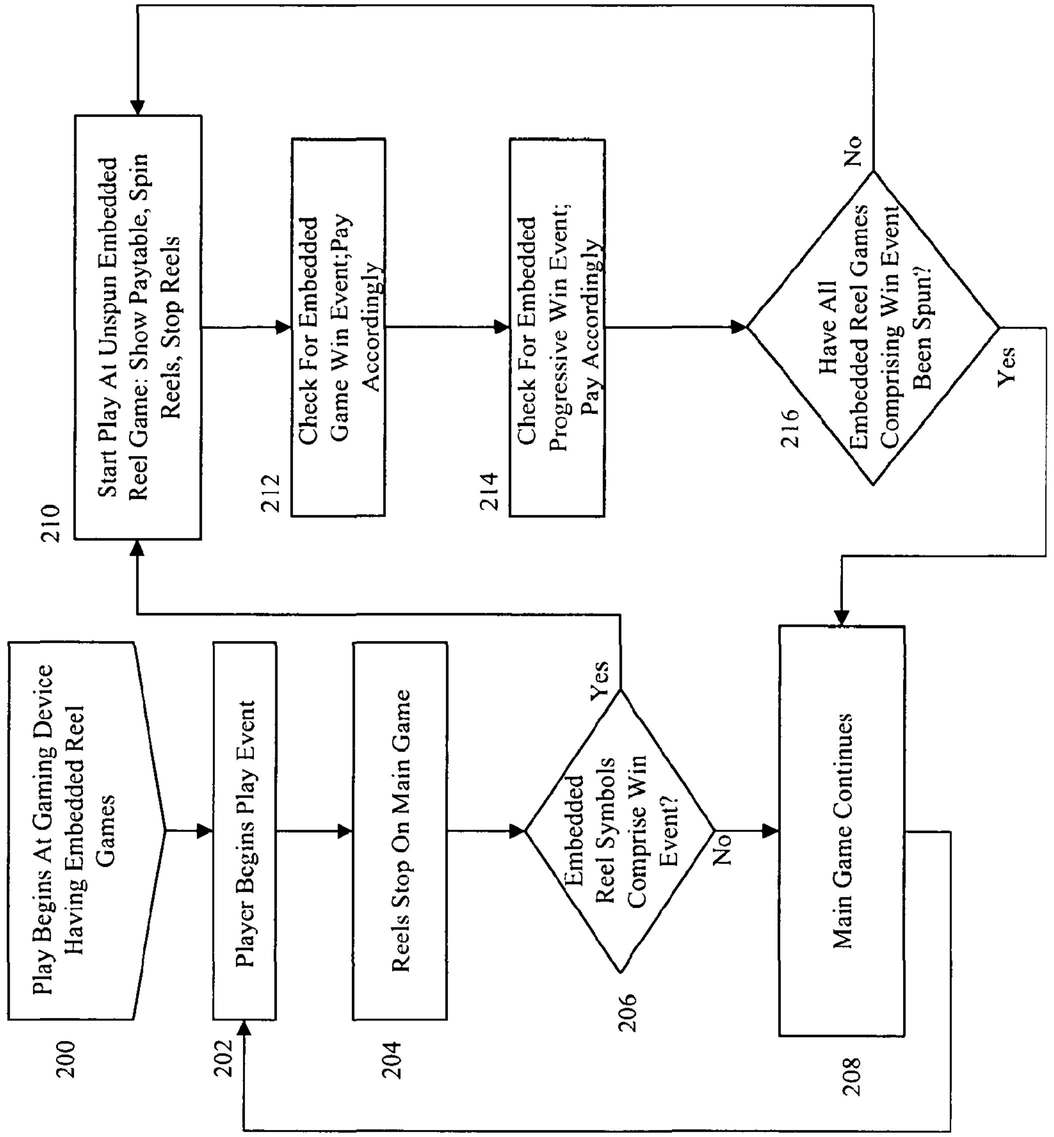
FIG. 2 is a flow diagram illustrating embedded reel game play in accordance with the present invention.

Referring to the drawings, for illustrative purposes the present invention is shown embodied in FIGS. 1 and 2. It will be appreciated that the apparatus may vary as to configuration and as to details of the parts, and that the method may vary as to details, partitioning, and the order of the acts, without departing from the inventive concepts disclosed herein.

FIG. 1 shows a game device according to the present invention. The game device has a cabinet 100 encloses a video display 102 and a set of standard game play buttons shown generally as buttons 104. The game device also comprises the internal hardware and software needed for gaming devices, including at least one processor, dynamic memory, non-volatile memory, system support circuitry such that a commercial operating system such as Linux will operably run therein, and I/O connections including interfaces to the various player devices such as buttons 104 and video 102. Further, it is expected that most embodiments will have an external network connection. Also included is the software needed to implement the specific game. The internals are not illustrated.

In addition to many features that are typical to a game device, the new and unique addition to reel gaming is shown in FIG. 1. There a five reels shown on video screen 102 as rectangular boxes. The main game will have its paytable and theme. In addition to the main game, there will be a special bonus symbol that, in one preferred embodiment, looks like 3 tiny reels in a tiny game display. Any number may be used in the miniature games, with one preferred embodiment using 3 reels with standard 17" or 19" screens, and using 3, 4, or 5 miniature reels in larger screens such as 27" or 32" LCD screens. When the bonus symbol appears in a winning location, a special event occurs.

Shown in FIG. 1 are three miniature reel symbols in locations 106, 110, and 108 after the reels have come to a stop in the main game. Shown is one embodiment where the player enters the bonus round if 3 of the miniature reel symbols show anywhere on the screen, making a scatter pay. The inventive bonus games disclosed herein may be triggered in any manner a game designer wishes.

Embedded reel window 112 corresponds to one of the embedded reel symbols 106, 108, or 110. Shown are three miniature reels 116 that will be "spun" (in actuality, visually simulating reel spins on a video screen). Also shown is progressive display meter 114. Progressive display meter 114 will contain a numeric value corresponding to the current value of the progressive associated with this particular embedded reel game. The progressive amount may be displayed in any convenient manner, including being shown as individual (per reel) banners or displays on the main reel game 118.

FIG. 2 illustrates game play with embedded reel games. Box 200 comprises those actions associating with a player choosing to play a reel game having embedded reel games. Continuing into box 202, the player begins play at the main game level, setting the main reels in motion. Box 204 corresponds to the main game finishing a spin, and the reels stopping. After the main reels stop, diamond 206 corresponds to the actions needed to determine if the miniature reel symbols found in the viewable area (102 of FIG. 1) comprise a win event that triggers play of the miniature reel games. If the answer is "No", diamond 206 is left for box 208. The actions corresponding to box 208 are any further actions needed to finish this game at the main level (for example, there may be other bonus win events that occurred in the same game and needing payout). After this game is completed, box 208 is left for box 202, where a next game is initiated.

Returning to diamond 206, if the answer is "Yes" then box 210 is entered. The actions corresponding to box 210 include those needed to generate and display one set of reel spins for an embedded reel game. One of the un-spun embedded reel symbols is animated. The order of playing each enabled bonus embedded reel game doesn't matter, but it expected that most game developers will choose to traverse the winning miniature reel symbols in left-to-right, top-to-bottom order. The symbol that is the representation of an embedded reel game either becomes animated in and of itself, or, is visually replaced with a representation of a set of reels of the reel game that is associated with the bonus game symbol.

A preferred embodiment is for the game to appear in miniature where the bonus symbol is; preferably the bonus symbol is the game and it appears to animate as the player watches. However, some game designers may want to have the embedded reel games play off to one side, above, in a different screen, or any other way attractive to a player. Whichever case is used in an implementation, the embedded reel game has its reels begin to spin. In one embodiment the paytable associated with the embedded reel game is shown to the right of the symbol. It may be shown in any way a game designer wishes. The order of these events is not important; for example, the paytable may be shown to the player first, and the player indicate when she or he is ready to start the embedded reel game with the touch of a button; alternatively, the paytable my be displayed during the entire time the embedded reel game is being played. One embodiment has the paytable appear as a side-pull pop-out display, which appears to slide out from the right of the symbol. Embedded reel game paytables may be shown to a player in any way, including being part of the static display on the game cabinet.

After the miniature reels stop, box 210 is left for box 212. The actions corresponding to box 212 include checked for and/or paying to the player any credits won based on the reels' final position. Box 212 is left for box 214, where the actions corresponding to this box include evaluating the stopped reels for a progressive win event.

The progressives associated with each embedded reel game may be implemented in any way suitable to the game designers. One preferred embodiment has a separate progressive associated with each embedded reel game (each different embedded reel game). In this embodiment, each reel of the 5 reels that make up the main reel game has one embedded reel game symbol associated with it. This is different from the embedded reel game found on each of the other four reels. A win event comprises two or more embedded reel game symbols appearing as a scatter pay (anywhere on two different reels). Thus, a win event may be comprised of 2, 3, 4, or 5 embedded reel game symbols on a 5-reel main game. In this embodiment each of the embedded reel games is a different game, and each will have its own progressive. It is thus possible for a player to win from 2 to 5 progressives during the play of a single embedded reel game bonus event!

Any configuration of progressives may be used with the present invention. This includes having a single progressive associated with any or all of the embedded games, which has the advantage of building a single higher jackpot over a plurality of smaller jackpots. Other embodiments include using the same progressive with the embedded reel games as is used with the main game. In this case, a player has the possibility of winning the current progressive up to 6 times on a single play (once on the main game, and once each on each of the embedded reel games up to 5). If this later embodiment is used, a preferred part of the embodiment would include the use of seed money or an initial minimal jackpot amount used in the funding of the progressive jackpot.

The winnings for the collective bonus round are built into the paytable of the main reel game based on the average win per game of the miniature games' paytables, totaled for the number of symbols comprising each win event. Progressives are expected to be funded in the same manner as is currently used for the main reel of the present invention; however, any method of funding progressive jackpots may be used.

Use of existing reel games as the embedded reel games was chosen based on brand and game recognition by players, but is not a requirement to practice the present invention. The miniature reel games may be custom made for each game having this bonus. Any number of miniature games may be used for the winning symbols, including the use of a single miniature reel game and a single bonus symbol; the miniature reel games may use any number of reels; variable paytables may be used based on the number of credits a player is making; etc. Further variations of the embedded reel games will come to the mind of a person skilled in this art and who has the benefit of the present disclosure; these variations are within the inventive scope of the present disclosure.

Upon evaluation and payout of any progressive win amount, box 214 is left for diamond 216. If all the symbols corresponding to embedded reel games have been played, then the "Yes" exit is taken to box 208 where any remaining actions associated with the main game are continued. If the answer is "No", then box 210 is re-entered and another miniature reel game is played. The loop comprised of boxes 210, 212, and 214 with diamond 212 continues until all the symbols that made up the current win event have their associated miniature reel games played. After that occurs, the main game is completed and the player is ready to initiate the main game again.

The presently preferred embodiment has each miniature reel game in the bonus round play in sequence. Another embodiment has all the miniature reel games play in parallel, which creates more excitement at the expense of possible confusion by some players. Upon the completion of each miniature reel game any winnings are added to the player's credit meter.

Although the description above contains certain specificity, the described embodiments should not be construed to be the scope of the disclosed invention; the descriptions provide an illustration of certain preferred embodiments. The scope is determined by the claims and their legal equivalents.

The invention claimed is:

1. A portable gaming device, comprising:

a housing including a display and a cavity containing gaming hardware and software;

an external network connection;

two or more reel games operable through the gaming hardware and software;

the display displaying a portion of one or more sets of reels in accordance with the reel games;

the reel games comprising:

a primary reel game; and one or more distinct embedded reel games;

wherein a primary reel game outcome is displayed by spinning and stopping at least the primary game reels;

wherein a first embedded reel game is displayed when a first trigger symbol appears on a first primary game reel as part of the primary reel game outcome, the first embedded reel game initiated by animating the first trigger symbol in place to simulate play of a first slot machine, the animation including displaying a first pay table associated with the first embedded reel game and visually spinning and stopping one or more first embedded reel game reels and awarding an award based on the final position of the first embedded reel game reels and the first paytable;

wherein a second embedded reel game is initiated when a second trigger symbol appears on a second primary game reel as part of the primary reel game outcome, the second embedded reel game initiated by animating the second trigger symbol in place to simulate play of a second slot machine, the animation including displaying a second pay table associated with the second embedded reel game and visually spinning and stopping one or more second embedded reel game reels and awarding an award based on the final position of the second embedded reel game reels and the second paytable;

wherein the first embedded reel game and the second embedded reel game are visually distinct from one another; and wherein the display of one or both of: (a) the primary reel game, and (b) the one or more distinct embedded reel games is enlarged on the display relative to other displayed elements.

2. The gaming machine of claim 1, wherein the first embedded reel game simulates a different slot machine game than the second embedded reel game.

3. The gaming machine of claim 1, wherein:

a first progressive jackpot is awardable according to the final position of the first embedded game reels and the first paytable; and a second progressive jackpot is awardable according to the final position of the second embedded game reels and the second paytable;

wherein both the first progressive jackpot and the second progressive jackpot may be won during a single play of the primary game.

4. The gaming machine of claim 1 wherein the first embedded reel game and the second embedded reel game are animated sequentially.

5. The gaming machine of claim 1 wherein the first embedded reel game and the second embedded reel game are animated substantially in parallel.

6. The gaming device of claim 1, wherein the display of one or more distinct embedded reel games is enlarged using a faux magnifying effect.

7. The gaming device of claim 1, wherein the display of the primary reel game is enlarged using a faux magnifying effect.

8. The gaming device of claim 1, wherein the primary reel game is displayed as virtual video reels.

9. The gaming device of claim 1, wherein the first and second embedded reel games are displayed as virtual video reels.

* * * * *